(12) United States Patent
Dean et al.

(10) Patent No.: US 6,232,915 B1
(45) Date of Patent: May 15, 2001

(54) SYSTEM AND METHOD FOR IDENTIFYING CLUSTERS OF GEOGRAPHIC LOCATIONS

(75) Inventors: Vincil C. Dean, Louisville; Djangir A. Babayev, Boulder, both of CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/386,757

(22) Filed: Aug. 31, 1999

(51) Int. Cl.[7] ............................... G01S 5/02; G01S 3/02; H04B 7/185

(52) U.S. Cl. ............................. 342/357.07; 342/357.13; 342/457

(58) Field of Search ................. 342/357.17, 357.13, 342/457

(56) References Cited

U.S. PATENT DOCUMENTS 5,919,239 * 7/1999 Fraker et al. ........................ 701/35

* cited by examiner

Primary Examiner—Thomas H. Tarcza
Assistant Examiner—Fred H Mull
(74) Attorney, Agent, or Firm—Marsh Fischmann & Breyfogle LLP

(57) ABSTRACT

A fleet monitoring system provides the ability to collect location information for a number of different fleet vehicles and identify clusters of activities based on frequency of activities occurring within a defined distance from each other. The activities being clusters may be associated with location with locations where fleet vehicles are parked after they have reached their destinations. To monitor a fleet, vehicles in the fleet are equipped with a GPS unit to record location information. The location information is later analyzed at a central location to identify clusters of stop locations based on latitude and longitude information reported by the GPS units in the vehicles. The clustering program is used to detect locations frequently visited by the field representatives.

32 Claims, 6 Drawing Sheets

Map illustrating clustering: MAXDIST1 = 300 feet, MAXDIST2 = 200 feet and NMIN = 4.

SYSTEM AND METHOD FOR IDENTIFYING CLUSTERS OF GEOGRAPHIC LOCATIONS

FIELD OF THE INVENTION

The present invention generally relates to a method and system for processing data, and, in particular, to a method and system for identifying clusters of geographic locations.

BACKGROUND OF THE INVENTION

Many companies today employ field representatives to provide services to remote locations. It is often difficult for the managing staff of a company to effectively keep track of all service activities performed by their field representatives, especially for those companies that utilize a relatively large number of field representatives covering vast geographic area. Some services requested by clients may be completed in one service visit while other requested services may require several and even many repeated visits before they are completed. Frequent service visits to the same facility location may indicate that some sort of proactive maintenance work is required. However, if managing staff fail to recognize the recurring problem within the same facility location, the required proactive maintenance work may be omitted or delayed, leading to inefficient operations.

One way to monitor field representatives is to equip fleet vehicles with global positioning system (GPS) equipment. The GPS periodically reports the vehicle's position to a central location. The positional information may be used to optimize the allocation of job assignments. One problem faced with the use of GPS in fleet vehicles is the difficulty associated with manually processing data from the GPS units to evaluate efficiency and to provide guidance on how to optimize operations in the future.

SUMMARY OF THE INVENTION

The inventors have recognized that geographic locations may be grouped in clusters to provide identification for certain information. If the geographic locations of certain events, such as locations where field representatives stopped to perform their services, are available, certain processing operations may be performed to the geographic locations data in order to identify clusters of service visits that are located within a defined distance from each other.

The present invention is directed to a method and system for identifying clusters of activities based on frequency of activities occurring within a defined area. The clusters of activities may be associated with locations where fleet vehicles are parked after reaching their destinations. The present system may utilize GPS units, each of which includes a GPS receiver to detect geographic locations of the vehicles and store positional data in an onboard memory connected thereto. The system of the invention may also include a software program executable on a computer configured to identify clusters of stop locations of the vehicles based on latitude and longitude information reported by the GPS receivers in the vehicles.

In one aspect of the invention, the GPS unit may be configured to periodically record GPS positional data as the vehicle moves from one destination to another. Later, a computer at a central location may be used to process the GPS positional data to extract the locations where the vehicle was stopped at one location for an extended period of time. Alternatively, the GPS unit may be configured to record only when the vehicle is parked after it has reached its destination.

In another aspect of the invention, a clustering analysis may be accomplished with a standalone computer system. The GPS positional data stored in the on-board memory may be transferred to the computer system at a central location via a wireless communication network. Accordingly, a wireless network controller, such as a cellular transceiver, may be provided in the GPS unit to transmit positional data via wireless data signals. At the central location, the computer system may include a modem for establishing a data connection with the GPS units.

The clustering analysis may be used to monitor fleet activities. During the course of a working day, field representatives use their fleet vehicles to move from one destination to another. For purposes of supervising field representatives and planning future operations, frequent stops occurring within a close distance from each other or "hot spots" may be particular points of interest. A user at a central location may use the clustering analysis to detect frequent service visits made to the same location which may indicate recurring problems requiring proactive maintenance work. The clustering analysis may also be used to detect locations where work breaks are frequently taken.

In yet another aspect of the invention, the cluster analysis may be performed by a clustering module which is part of the computer system. The clustering module may start by reading stop locations into an array of input points, each stop location corresponding to a location where a vehicle equipped with the above-described GPS unit was parked at certain location for an extended period of time. The clustering module may then proceed by sorting the input points by their location, such as x-coordinates of the input points. Next, every input point in the array may be compared against a list of locations to ignore so that any input points closely located with respect to any ignore locations may be removed from consideration in the clustering process. At this point, the clustering module may link each input point with other input points that lie close enough to be considered neighbors. Once the linked lists of the input points are generated, an input point with the largest number of neighbors is selected. If the selected input point has at least a minimum number of neighbors, the selected input point and all its neighbors are recognized as a cluster by recording the center point (i.e. the location of the selected input point) and number of input points associated with the cluster. At this point, each of the input points associated with the recognized cluster is marked in the corresponding entries in the linked lists so that they can be ignored during subsequent searches for clusters of stop locations. The cluster module may then proceed to identify the next largest cluster. This process may be continued until there are no more input points with at least a minimum number of neighbors.

In yet another aspect of the invention, the system may include a user interface through which inputs may be entered for selection and changing of the predetermined parameters used in the clustering program. In this way, a user may adjust the parameter values such that the output results obtained by the clustering program provides the most desirable results. The output of the clustering information may also be presented in a predetermined format.

DETAILED DESCRIPTION

Figure 1:
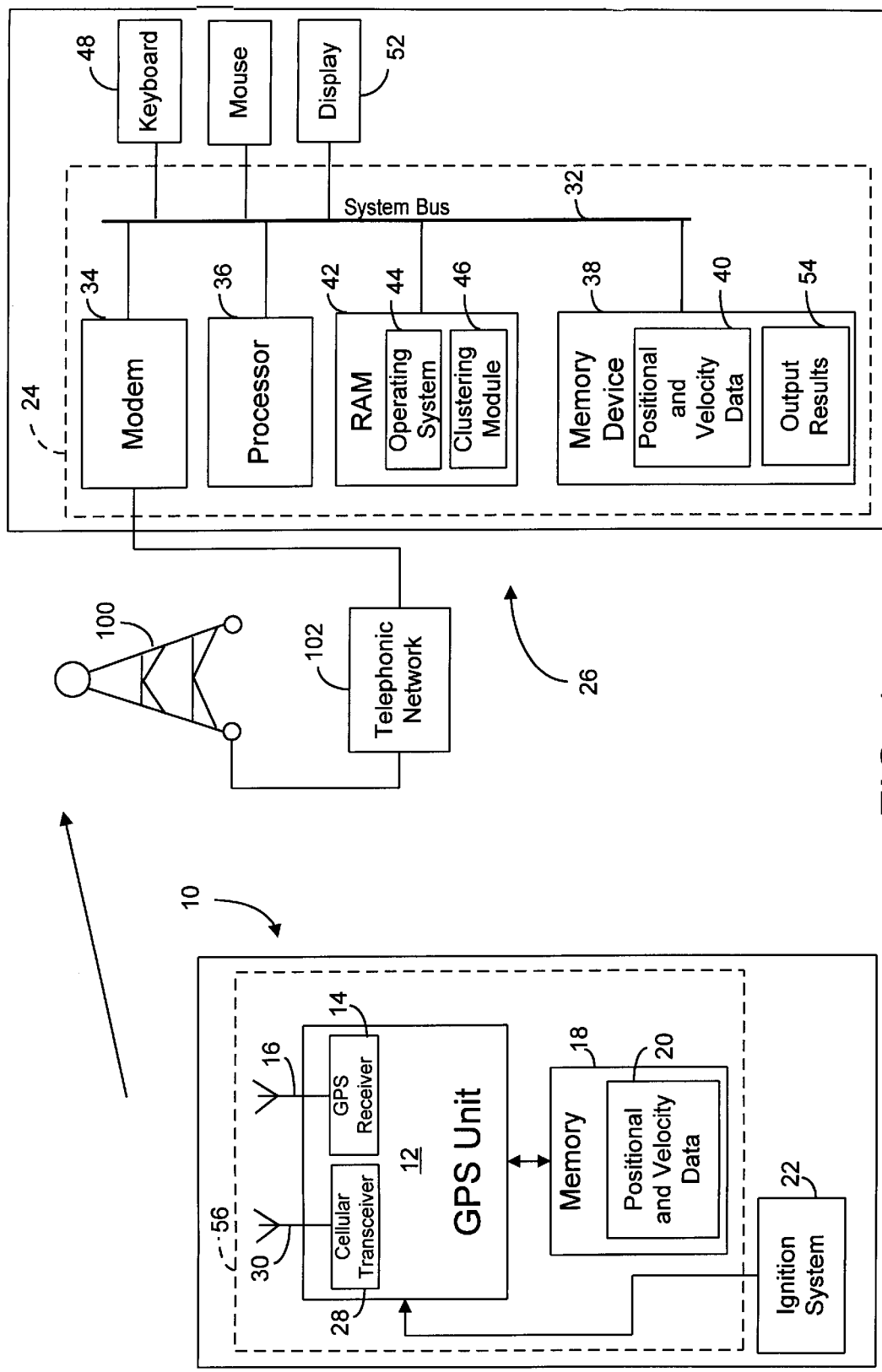
FIG. 1 is a block diagram illustrating a system for collecting GPS data and identifying clusters of stop locations in accordance with the present invention.

Disclosed in FIG. 1 is a system for collecting GPS data and identifying clusters of activities according to the present invention. Included in the system are one or more movable objects, such as a vehicle which is generally designated 10. The vehicle is equipped with a global positioning system (GPS) unit 12 for providing location (latitude and longitude) data. The GPS unit 12 may be configured to provide positional data on a periodic basis; for example, once every minute. Alternatively, the GPS unit 12 may be configured to generate positional data only when the vehicle is parked after reaching its destination.

As shown in FIG. 1, the GPS unit 12 is in connection with a memory 18 to store positional data 20. Included in the GPS unit is a processor (not shown) which controls operations of generating GPS data as well as operations of storing the GPS data into the memory. The GPS data may be time-stamped to indicate a particular time of day at which each set of positional and velocity data is generated. The GPS unit may be operatively coupled to the ignition system 22 of the vehicle to periodically receive information pertaining to the status of the ignition system. The GPS unit periodically receives and records in the memory the following information; the time of day, the latitude and longitude data, velocity information, and the on/off status of the ignition system. Also included in the GPS unit 12 is a wireless network controller such as a cellular transceiver 28, which is connected to a cellular antenna 30 for transmitting and receiving wireless data signals. The wireless communications network may comprise any suitable network such as a cellular communications network, personal communication systems (PCS), radio frequency communication networks or satellite communications.

Data signals transmitted over the communications network are received by a computer 24. Implemented in the computer 24 is a clustering module 46 for processing the data received from the GPS units. The computer 24 is located at a central location 26 and is configured such that the data generated by a number of different GPS units can be processed at the same time. The various GPS units may be located in fleet vehicles. A wireless communications network may be utilized to periodically transfer collected data from the fleet vehicles to the central office 26. Alternatively, the collected data may be copied onto a data transfer medium such as a magnetic or optical disk and physically carried and loaded onto the computer 24 at the central office.

For purposes of reporting current positional information to the central office, the GPS unit may be configured to automatically establish a wireless connection with the computer 24 at the central office and transmit GPS data at predetermined time intervals; for example, once every hour. In one embodiment, the GPS unit may be configured to transmit accumulated data once the vehicle is parked with the ignition off. In this embodiment, the GPS unit is preferably programmed to collect at least one positional reading after the ignition is deactivated so as to ensure that at least one GPS data point corresponds to the parked location.

The computer 24 at the central office 26 may be any computer capable of performing sequential program execution, including personal computers, minicomputers or mainframes.

The computer 24 includes a system bus 32 to which various components are coupled, such as a modem 34 for establishing a data connection with the GPS unit via a wireless communications network. The wireless communication network includes a wireless tower 100 for receiving wireless signals and relaying the received signals to a telephonic network 102, which routes the signals to the modem. The computer 24 also includes a processor 36 and a memory device 38 which stores, among other things, the GPS data 40 provided by the GPS unit 12. The memory device 38 may be any suitable storage device such as a hard drive, floppy disk drive, tape unit, CD-ROM and the like. Connected to the processor 36 is a random access memory (RAM) 42 into which an operating system 44 and the grouping program of the invention are loaded. Also connected to the system bus 32 are input devices such as a keyboard 48 and a mouse 50 and a display unit 52.

In operation, field representatives may use fleet vehicles to move from one destination to another. Each of the destinations may correspond to the location where the requested service is to be performed or the location where a work break is taken. As the fleet vehicles travel between job sites, the GPS units in the vehicles are used to generate positional and/or velocity information and periodically transmit the data to the central office, where the data is analyzed. The computer 24 at the central office processes the GPS information to identify stop locations or stationary segments. The identification of stop locations or stationary segments may be accomplished using any suitable method. One exemplary method of identifying stationary segments is described in a co-pending U.S. application Ser. No. 09/386, 756, filed Aug. 31, 1999 to Vincil C. Dean, entitled "System and method for grouping GPS data into moving and stationary segments," which is incorporated herein by reference.

A list of frequent stops occurring within a close distance from each other or "hot spots" location points which have been visited often by fleet vehicles within a given period of time may provide useful insight into behavior and habits of field technicians, or possible trouble spots in remote facilities. Because fleet vehicles don't always park in the same place, and because there may be some error in the GPS positions, the hot spot may not be a single point in space, but rather a fuzzy region. The present invention uses the latitude and longitude of every stop to identify "clusters" of points that are within a defined distance from each other to be considered a single hot spot.

Figure 2:
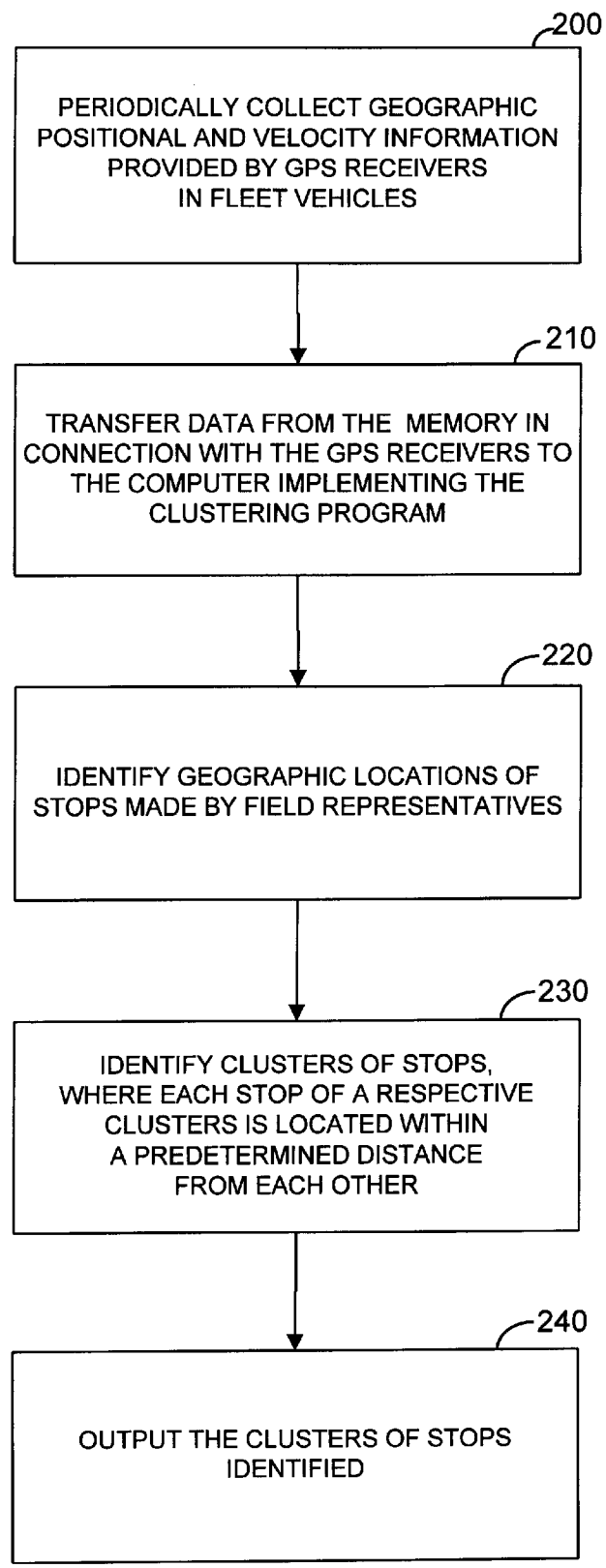
FIG. 2 is a flowchart diagram illustrating the general steps of collecting GPS data and identifying clusters of stop locations according to the present invention.

Referring to FIG. 2, the general steps of the system for collecting GPS data and identifying clusters of geographic locations according to the present invention are shown. In step 200, the GPS receiver 14 is used to generate positional and velocity data on a periodic basis. The data collected by the GPS receiver 14 is transferred to the computer 24 at the central office 26 in step 210. In step 220, the computer 24 then processes the GPS data to identify stop locations that were visited by field representatives during a predefined period of time. The identification of the stop locations may be determined based on several variables, such as vehicle speed, traveled distance between two data points, on/off status of ignition system 22, and duration of stationary time interval. After stop locations are identified, the system proceeds in step 230 to identify clusters based on the stop locations. Finally, in step 240, the clusters identified are displayed in a map format or printed in a report format.

Figure 3:
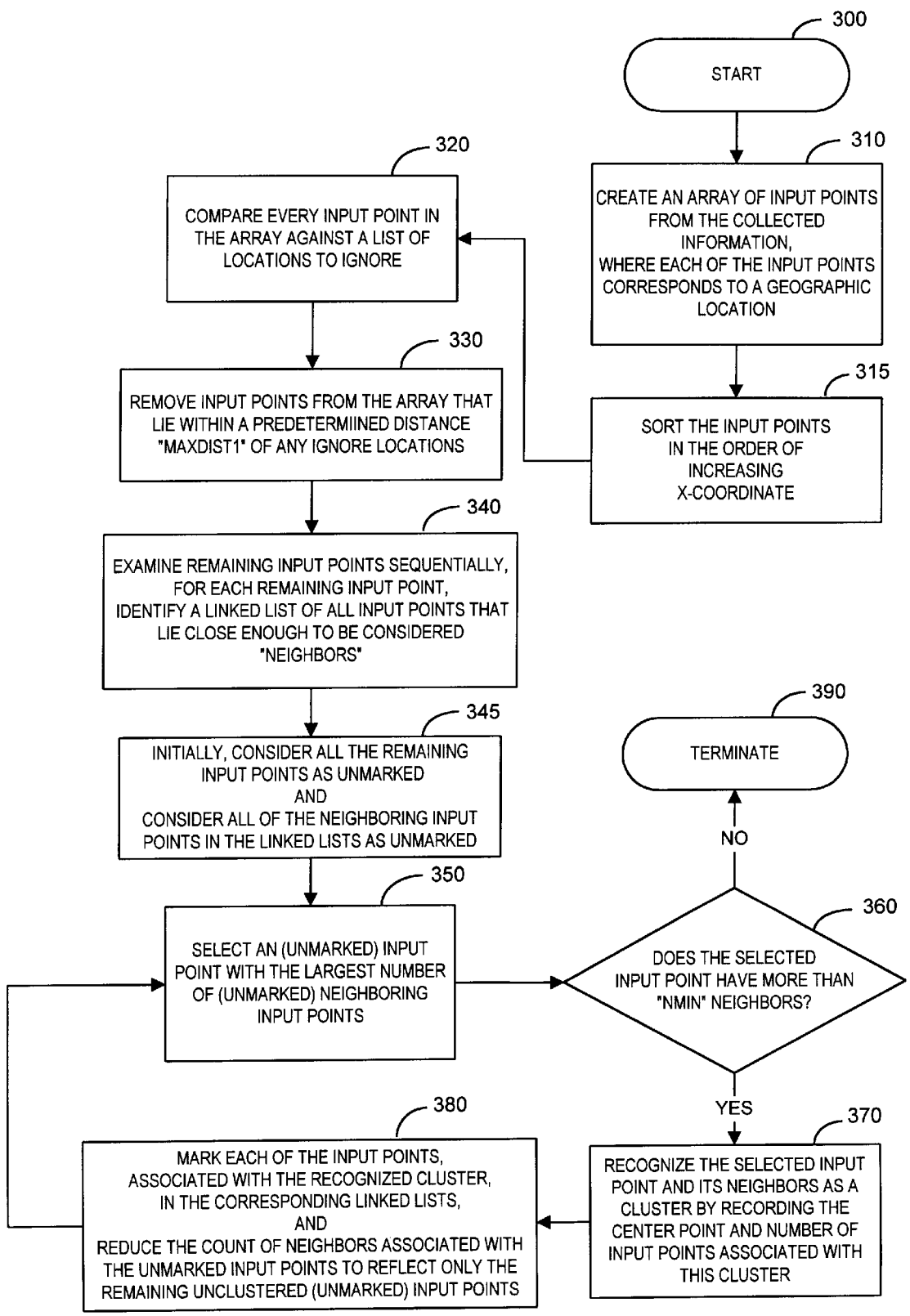
FIG. 3 is a flowchart diagram illustrating the process of a clustering program according to the present invention.

Step 230 is performed by clustering module 46. Disclosed in FIG. 3 is a flowchart diagram of a clustering program according to the present invention. The execution of the clustering program begins at step 310, where the application program reads the stop locations stored in memory into an array of input points. Each input point in the array represents a geographic location of a stop identified in step 220 of FIG. 2. It should be noted that the coordinates of stop locations may be provided in longitude and latitude expressed in the form of degrees. In this case, the stop locations may be converted to x, y coordinates before they are read into the array of input points. The method of converting longitude and latitude data to the form of x, y coordinates is well known in the art. Although the described input points are expressed in the form of x, y coordinates to illustrate the principles of the present invention, it will be understood by those skilled in the art that the input point may be expressed in other format including in degrees.

In step 315, the clustering program proceeds by sorting the input points according to their locations, e.g., by increasing x-coordinate of the input points. Next in step 320, every input point in the array is compared against a list of locations to ignore. The ignore locations may be, for example, parking areas where the fleet vehicles are parked after working hours and other locations such as the location where equipment and parts are picked up. Every input point that lies within a maximum distance tolerance "MAXDIST1" of any ignore location is removed from further consideration in the clustering process (step 330). The MAXDIST1 is a predefined value, for example, specified in feet, i.e., 100 feet, to represent a distance between a stop location and any ignore locations within which such stop location is considered unimportant and removed from the array. Then in step 340, the input points are examined sequentially, linking each input point with all of the other input points that lie close enough to be considered neighbors. This process is continued until linked lists associated with each of the input points are generated.

Once the step of generating linked lists is completed, the clustering program proceeds in a loop (steps 350–380) to identify clusters of input points in a descending order of cluster size. Prior to the execution of this loop, all remaining input points are initially considered unmarked including the neighboring input points that are contained in the linked lists (step 345). Each time a cluster is identified, the input points associated with the identified cluster become marked serving to indicate that the marked input points have already been included in one of the identified clusters.

The loop (steps 350–380) starts by selecting an (unmarked) input point with the largest number of neighbors in step 350. The number of neighbors associated with the input point is compared against a minimum number of neighbors criterion ("NMIN"). The NMIN is a predetermined number, representing a minimum number of neighbors necessary to constitute a cluster. If the selected input point has at least NMIN neighbors (step 360, YES), the selected input point is the center point of a cluster and all its neighbors are recognized as members of the cluster (step 370) by recording the center point and number of input points associated with this cluster.

Then in step 380, each of the input points associated with the recognized cluster is marked in the corresponding linked lists so that the marked input points will be ignored during search for subsequent clusters. Additionally in step 380, the number of neighbors associated with each of the remaining input points is revised to reflect only the remaining unclustered (unmarked) input points (step 380). Next, the program returns to the beginning of this loop (step 350) where an input point with the largest number of (unmarked) neighboring input points is selected. This process of identifying clusters is continued until there are no more input points with at least NMIN neighbors (step 360, NO).

Figure 4:
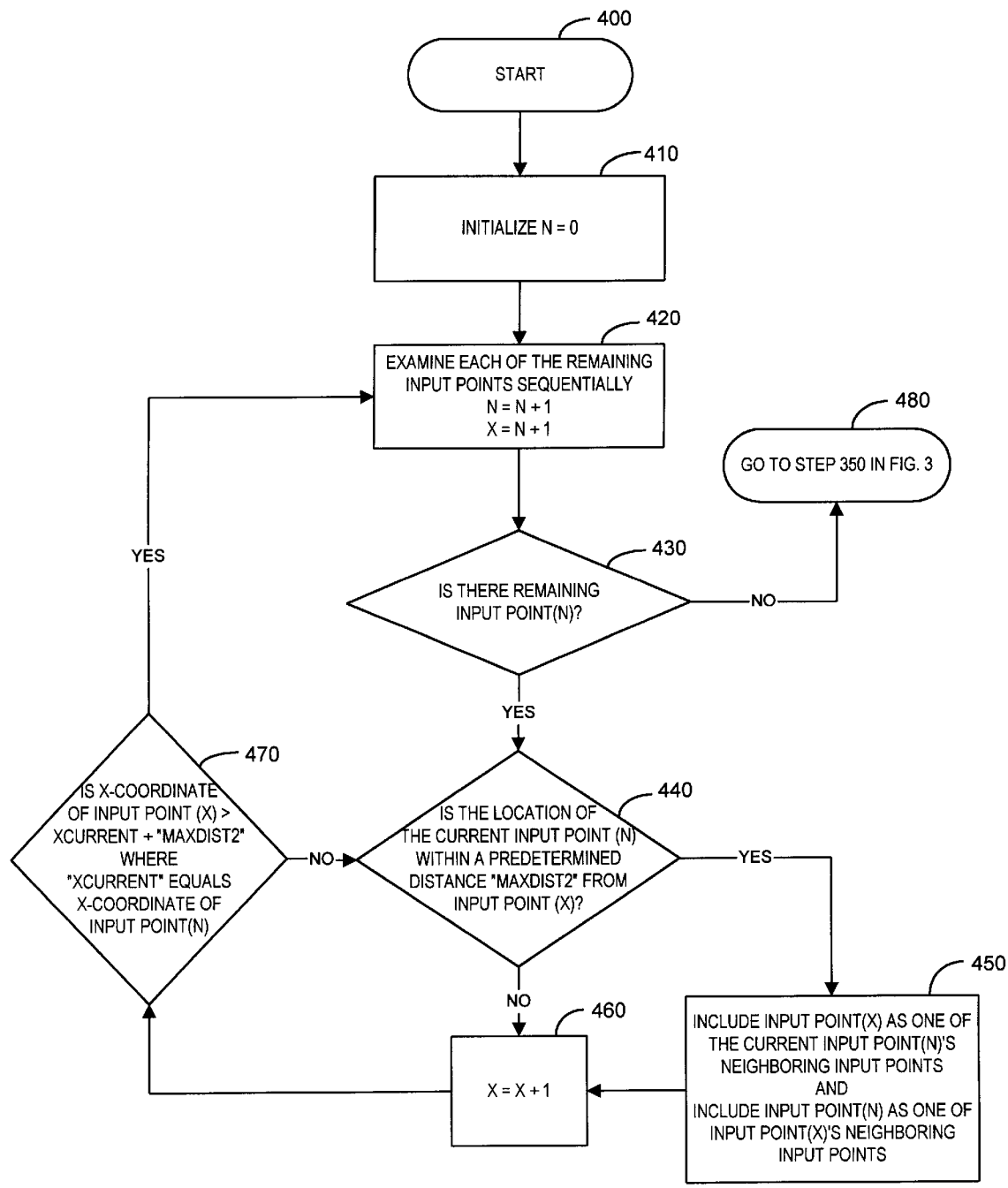
FIG. 4 is a flowchart diagram illustrating a portion of the process of the clustering program in FIG. 3.

Referring now to FIG. 4, an expanded flowchart of step 340 of FIG. 3 is shown.

The execution of step 340 of FIG. 3 begins at step 400 in FIG. 4. Once input points, that lie within a defined distance from any ignore locations, are removed from the array (steps 320,330 of FIG. 3), a counter N is initialized; i.e., the counter is set to zero (step 410). At this point, the clustering program proceeds in a main-loop (steps 420–470) to generate a linked list of neighbors for each of the remaining input points sequentially. The main-loop comprises a series of steps to determine which of the other remaining input points are located within a predetermined distance to be considered a neighbor.

Within the main-loop is a sub-loop (steps 440–470) which compares the location of the current input point(N) to the location of each of the following input points sequentially to determine if the input point(X) resides within a predetermined distance "MAXDIST2" from the input point(N) (step 440). The MAXDIST2 is a predefined value, for example, specified in feet, i.e., 100 feet, to represent a distance between two stop locations within which such stop locations are close enough to be considered a neighbor. After each comparison, a counter X is incremented by one and proceeds to the next remaining input point(X). For each input point (X) located within the MAXDIST2 distance of input point (N), corresponding entries are made in the linked lists of neighboring input points (step 450), which include entering input point (X) as one of the input point(N)'s neighboring input points as well as entering input point (N) as one of the input point(X)'s neighboring input points.

This sub-loop (steps 440–470) works its way through the array of input points which is sorted by x-coordinate (step 335 in FIG. 3). Each input point following the current input point(N) is examined individually until an input point(X) having an x-coordinate greater than XCURRENT plus MAXDIST2 is reached (step 470, YES), where XCURRENT equals the x-coordinate of the current input point(N). Because the input points are sorted by x-coordinate, it is not necessary to examine input points that follow the first input point(X) with x-coordinate that is further than MAXDIST2 from XCURRENT. In this regard, the execution time required to identify the linked lists of neighbors for each individual input point is substantially reduced. Once such input point(X) with x-coordinate located further than MAXDIST2 from XCURRENT is identified, the clustering module proceeds at the top of the main-loop step 420. At each start of the loop (step 420), the counter N increments its count by one and proceeds to the next input point. The main-loop (steps 420470) is continued until end of the input points is reached (step 430, NO) and terminates in step 480. At this point, the clustering module resumes to step 350 in FIG. 3.

Figure 6:
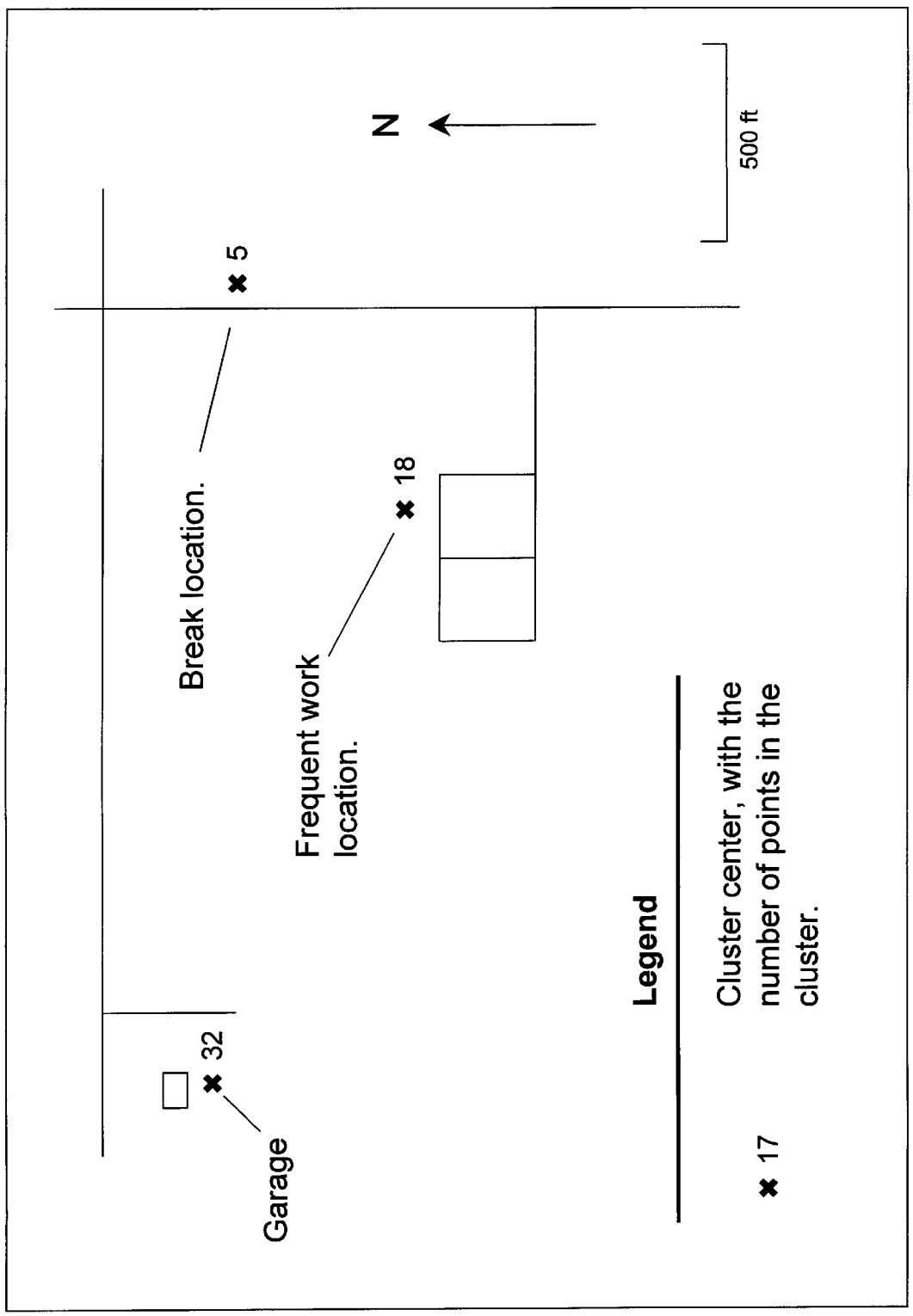
FIG. 6 is an example of a simplified display presenting results in map format illustrating cluster centers and the number of points in each cluster.

The output results of the clustering program are stored in the memory which includes the number of clusters identified and location of the center point and number of input points associated with each cluster. The output results may be presented either in map display format or text format. As seen by referring to FIG. 6, the output results can be displayed in an easily comprehensible way in the map display format, so that the clusters of activities can be readily observed by a user to facilitate spotting problems or unusual behavior of the field agents. In this format, the output results are graphically displayed on the display screen using map images stored in the computer memory. An appropriate map image is first selected based on the locations to which the associated vehicles traveled. The selected portion of the map image is then retrieved and displayed on the display screen, so that symbols or icons representing the location of each cluster may be displayed on the map image. The cluster symbols or icons may be labeled with the location of the center point and number of input points associated with each cluster. Other significant information can also be symbolically displayed with the map image, such as locations of job assignments that were dispatched during the same period of time. In this regard, the map format enables a user to observe which clusters are located closely to job assignments and which clusters are not associated with any of the job assignments.

In the text format, the location of center point and number of input points associated with each of the clusters identified may be presented to a user. For clusters that are closely located to any of the job assignments, the program may be configured to report the location and brief description of such job assignment. Further, the text format may contain detailed information about each of the identified clusters, such as names of field representatives and arrival and departure time associated with each of the corresponding input points.

Figure 5:
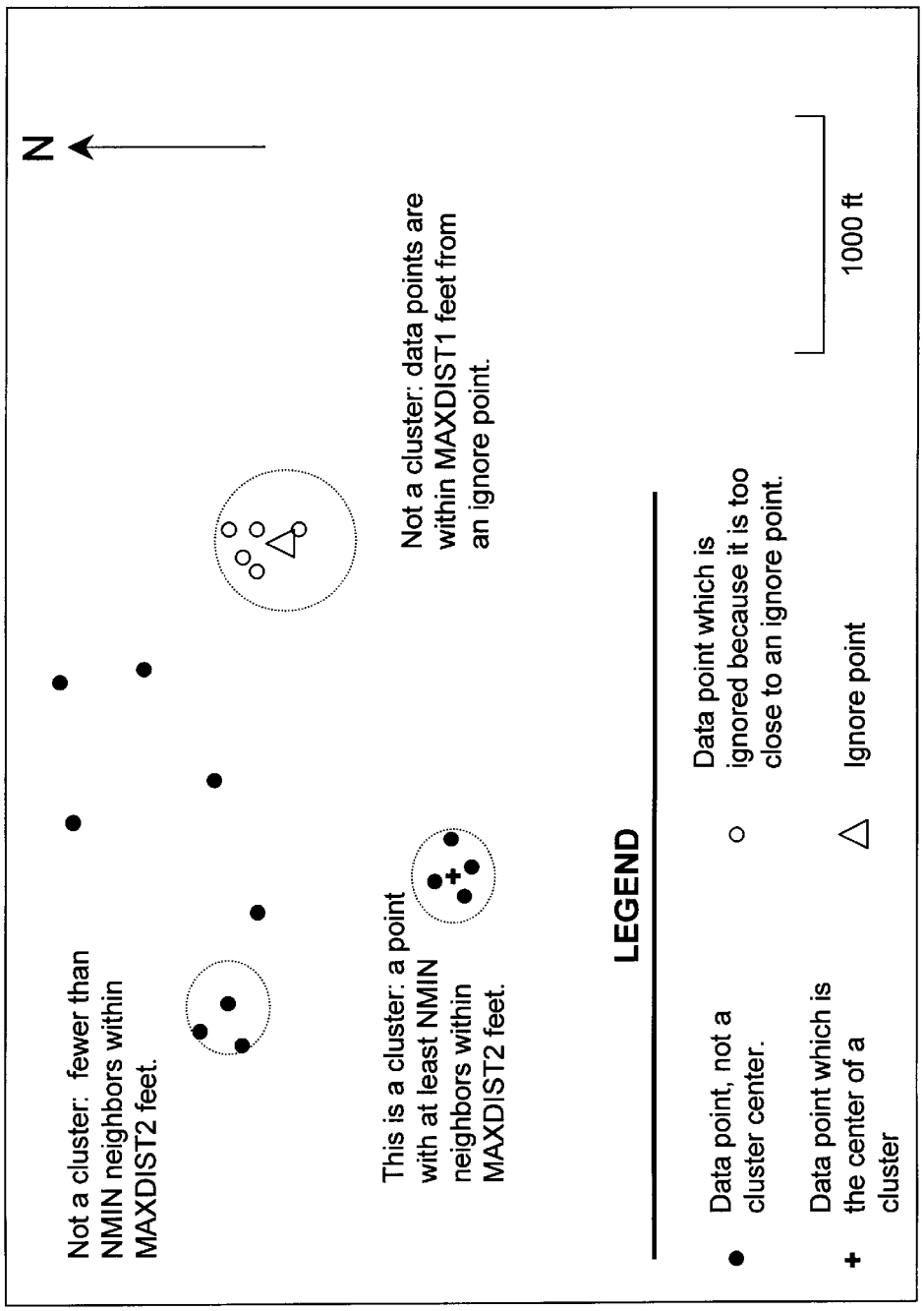
FIG. 5 is a simplified display illustrating identification of clusters of stop locations being implemented according to various parameters.

FIG. 5 shows identification of clusters of stop locations being implemented according to various parameters. The clustering program may further include a user interface which allows for selection and modification of the predetermined parameters, such as MAXDIST1, MAXDIST2, and NMIN. Moreover, the user interface may be configured to allow a user to add or modify ignore locations so that only the location information which is relevant for clustering analysis is considered. In this way, a user may adjust the parameter values such that the output results obtained from the clustering program provide the most useful results. The user interface may also be configured to permit the user to select the way in which the output results are presented.

It should be noted that in addition to the application in connection with fleet vehicles, the present system has application to substantially any situation where the number of activities occurring within certain geographic location areas may provide a planner with useful insight as to find ways to optimize future operations. For example, the present system may be used in a variety of industries, including telecommunications and other facilities-based utilities, and other dispatch-oriented operations such as police, taxi, medical and delivery services.

While the foregoing preferred embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. A system for monitoring movements of a remotely located object, comprising:
   a GPS receiver to generate GPS data which includes at least positional information of the remotely located object;
   a memory to store data;
   a memory interface to receive GPS data from the GPS receiver and store the GPS data in the memory;
   a processor configured to receive said positional information in the memory, identify stop locations where the object is substantially stationary at one location for a defined minimum period of time and identify clusters of stop locations based on frequency of stop locations occurring within a defined distance from each other; and
   a user interface in connection with the processor to output said clusters of stop locations identified.

2. The system of claim 1, wherein the GPS data further includes velocity information and time information corresponding to a time at which the positional and velocity information is generated.

3. The system of claim 1, wherein the stop locations are identified by the processor configured to:
   (a) examine each of the GPS data sequentially to identify a first point in time at which the object is moving at less than a predetermined velocity;
   (b) examine subsequent GPS data sequentially until a second point in time is identified at which the object starts to move at greater than said predetermined velocity;
   (c) calculate a time interval elapsed between said first and second points in time;
   (d) recognize a positional information of the GPS data corresponding to said first and second point in time as one of the stop locations if said time interval calculated exceeds a predetermined time interval; and
   (e) repeat (a)–(d) until end of the GPS data is reached.

4. The system of claim 1, wherein the clusters of stop locations are identified by the processor configured to:
   (a) read the stop locations into an array of input points;
   (b) generate linked lists of neighboring input points, wherein each linked list includes all neighboring input points that are within a defined distance;
   (c) identify one of said input points with the largest number of said neighboring input points;
   (d) recognize said one of said input points identified and said corresponding neighboring input points as a cluster if the number of said neighboring input points exceed a defined number;
   (e) mark said selected input point and said neighboring input points of said recognized cluster so that the marked points are ignored during subsequent identification of next largest cluster; and
   (f) repeat (c)–(e) until there are no more input points with at least said defined number of neighboring input points.

5. The system of claim 4, wherein the processor is further configured to sort the array of input points by their locations prior to generating said linked lists of neighboring input points.

6. The system of claim 4, wherein the clustering module is further configured to compare the array of input points against a list of ignore locations so that any input points located within a predetermined distance from any ignore locations are removed from the array prior to generating said linked lists of neighboring input points.

7. The system of claim 1, wherein the clusters of stop locations are identified by the processor configured to:
   (a) read the stop locations into an array of input points;

(b) link each of said input points with other input points that are within a defined distance;

(c) select one of said input points with the largest number of linked input points;

(d) recognize said selected one of said input points and said linked input points as a cluster if the number of said linked input points exceed a defined number;

(e) remove said selected input point and said linked input points from the array; and (f) repeat (b)–(e) until there are no more input points with at least said defined number of linked input points.

8. The system of claim 1, wherein the GPS receiver is in connection with the object.

9. The system of claim 8, wherein the object is a service vehicle and the system is used to monitor a service representative operating the service vehicle.

10. A system for identifying clusters of geographic locations with regard to at least one remotely located movable object, comprising:

a memory to store data;

a first interface in connection with the memory to receive GPS data from the at least one remotely located movable object and stored the GPS data in said memory;

a clustering module configured to access said positional data stored in the memory, identify stop locations where said at least one movable object is substantially stationary at one location for a defined minimum period of time and identify clusters of stop locations of said at least one movable object based on frequency of said stop locations occurring within a defined distance from each other; and a second interface in connection with the clustering module to output said clusters of stop locations identified.

11. The system of claim 10, wherein the movable object is equipped with a GPS unit to provide positional data and a memory in connection with the GPS unit to store the positional data provided by the GPS unit.

12. The system of claim 11, wherein the GPS data is received from a plurality of vehicles, each of said plurality of vehicles being equipped with said GPS unit.

13. The system of claim 12, wherein the first interface includes a wireless communication interface to receive GPS data from the GPS units in the vehicles via a wireless communications network.

14. The system of claim 10, wherein the clustering module is configured to:

(a) read the stop locations into an array of input points;

(b) generate linked lists of neighboring input points, wherein each linked list includes all neighboring input points that are within a defined distance;

(c) identify one of said input points with the largest number of said neighboring input points;

(d) recognize said one of said input points identified and said corresponding neighboring input points as a cluster if the number of said neighboring input points exceed a defined number;

(e) mark said selected input point and said neighboring input points of said recognized cluster so that the marked points are ignored during subsequent identification of next largest cluster; and (f) repeat (c)–(e) until there are no more input points with at least said defined number of neighboring input points.

15. The system of claim 14, wherein the processor is further configured to sort the array of input points by their locations prior to generating said linked lists of neighboring input points.

16. The system of claim 14, wherein the clustering module is further configured to compare the array of input points against a list of ignore locations so that any input points located within a predetermined distance from any ignore locations are removed from the array prior to generating said linked lists of neighboring input points.

17. A method of monitoring movements of a remotely located object, comprising the steps of:

receiving information relating to stop locations of the object where the object is stationary for a defined minimum period of time; and identifying clusters of stop locations of the object based on frequency of stop locations occurring within a defined distance from each other.

18. The method of claim 17, further comprising the step of comparing said stop locations against a list of ignore locations so that any stop locations located within a first distance from any ignore locations are removed from consideration in the step of identifying clusters.

19. The method of claim 17, wherein the step of identifying clusters further comprises the steps of:

(a) reading the stop locations into an array of input points;

(b) generating linked lists of neighboring input points, wherein each linked list includes all neighboring input points that are within a defined distance;

(c) identifying one of said input points with the largest number of said neighboring input points;

(d) recognizing said one of said input points identified and said corresponding neighboring input points as a cluster if the number of said neighboring input points exceed a defined number;

(e) marking said selected input point and said neighboring input points of said recognized cluster so that the marked points are ignored during subsequent identification of next largest cluster; and (f) repeating steps (c)–(e) until there are no more input points with at least said defined number of neighboring input points.

20. The method of claim 19, wherein the step of identifying cluster further comprises sorting the array of input points by their locations prior to generating said linked lists of neighboring input points.

21. The method of claim 17, further comprising the step of providing a GPS unit at the remotely located object which includes a GPS receiver to generate positional information of the object at least at each stop location and a memory to store the positional information received from the GPS receiver.

22. The method of claim 20, further comprising the step of determining from the positional information stored in the memory the stop locations of the object where the movable object is stationary for a defined minimum period of time.

23. A method of monitoring a movable object, comprising:

receiving information relating to movement of the movable object;

identifying stop locations where the movable object is stationary for a defined minimum period of time; and identifying clusters of stop locations of said movable object based on frequency of stop locations occurring within a defined distance from each other.

24. The method of claim 23, further comprising the step of comparing said stop locations against a list of ignore locations so that any stop locations located within a first distance from any ignore locations are removed from consideration in the step of identifying clusters.

25. The method of claim 23, wherein the step of identifying clusters further comprises the steps of:
   (a) reading the stop locations into an array of input points;
   (b) generating linked lists of neighboring input points, wherein each linked list includes all neighboring input points that are within a defined distance;
   (c) identifying one of said input points with the largest number of said neighboring input points;
   (d) recognizing said one of said input points identified and said corresponding neighboring input points as a cluster if the number of said neighboring input points exceed a defined number;
   (e) marking said selected input point and said neighboring input points of said recognized cluster so that the marked points are ignored during subsequent identification of next largest cluster; and
   (f) repeating steps (c)–(e) until there are no more input points with at least said defined number of neighboring input points.

26. The method of claim 25, further comprising the step of sorting said stop locations according to their location prior to the step of generating linked lists of neighboring input points.

27. The method of claim 23, wherein the step of recognizing said cluster further comprises recording a center location and number of input points associated with said cluster.

28. The method of claim 23, wherein the step of recording location of said movable object is accomplished with a GPS receiver.

29. The method of claim 25, further comprising the step of allowing a user to modify said first distance, said second distance and selected number.

30. The method of claim 23, wherein the information with regard to the movable object is provided by a GPS unit in connection with the movable object.

31. The method of claim 30, wherein the information provided by the GPS unit includes positional and velocity information.

32. The method of claim 31, wherein the step of identifying stop locations comprises:
   (a) examining each of the velocity information sequentially to identify a first point in time at which movable object is moving at less than a predetermined velocity;
   (b) examining subsequent velocity information sequentially until a second point in time is identified at which the movable object starts to move at greater than said predetermined velocity;
   (c) calculating a time interval elapsed between said first point in time and said second point in time;
   (d) recognizing the positional information corresponding to said first and second point in time as one of the stop locations if said time interval calculated exceeds a predetermined time interval; and
   (e) repeating steps (a)-(d) until end of the positional and velocity information is reached.

* * * * *